Feb. 20, 1951            J. R. McGUIRE            2,542,202
AIRCRAFT AIR-SPEED REGULATOR
Filed June 3, 1946            2 Sheets-Sheet 2
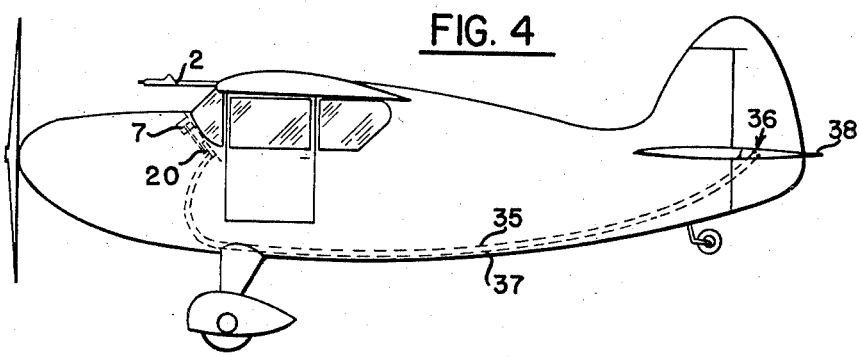
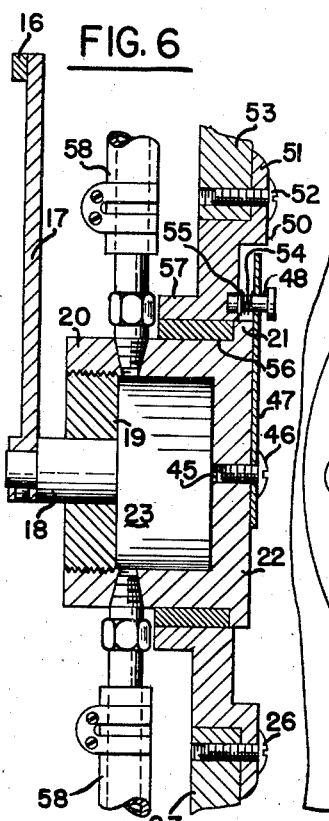
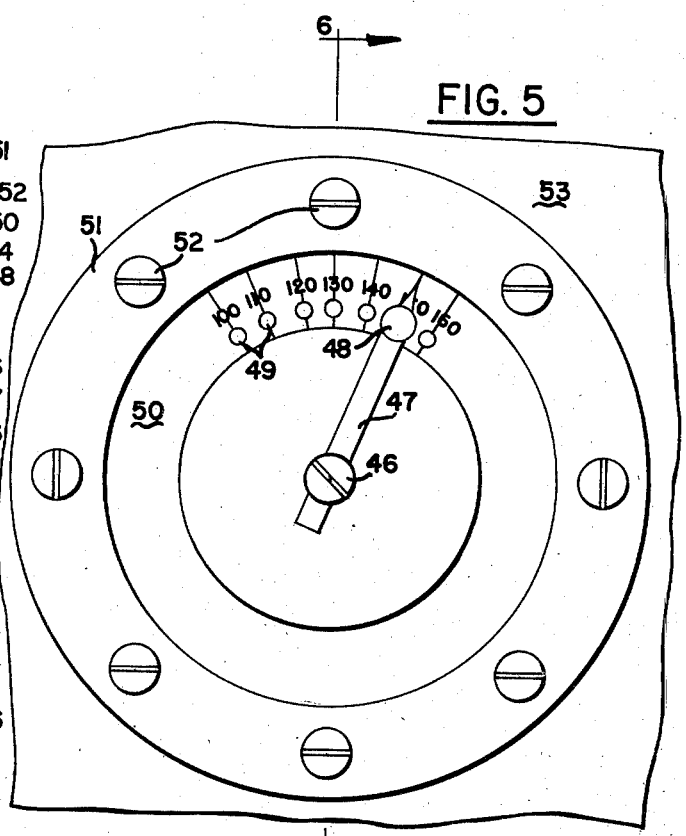
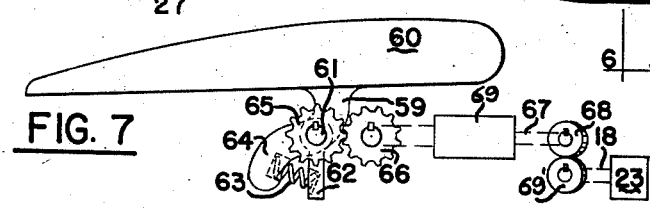
INVENTOR
J. ROY McGUIRE
BY
Toulmin & Toulmin
ATTORNEYS Patented Feb. 20, 1951

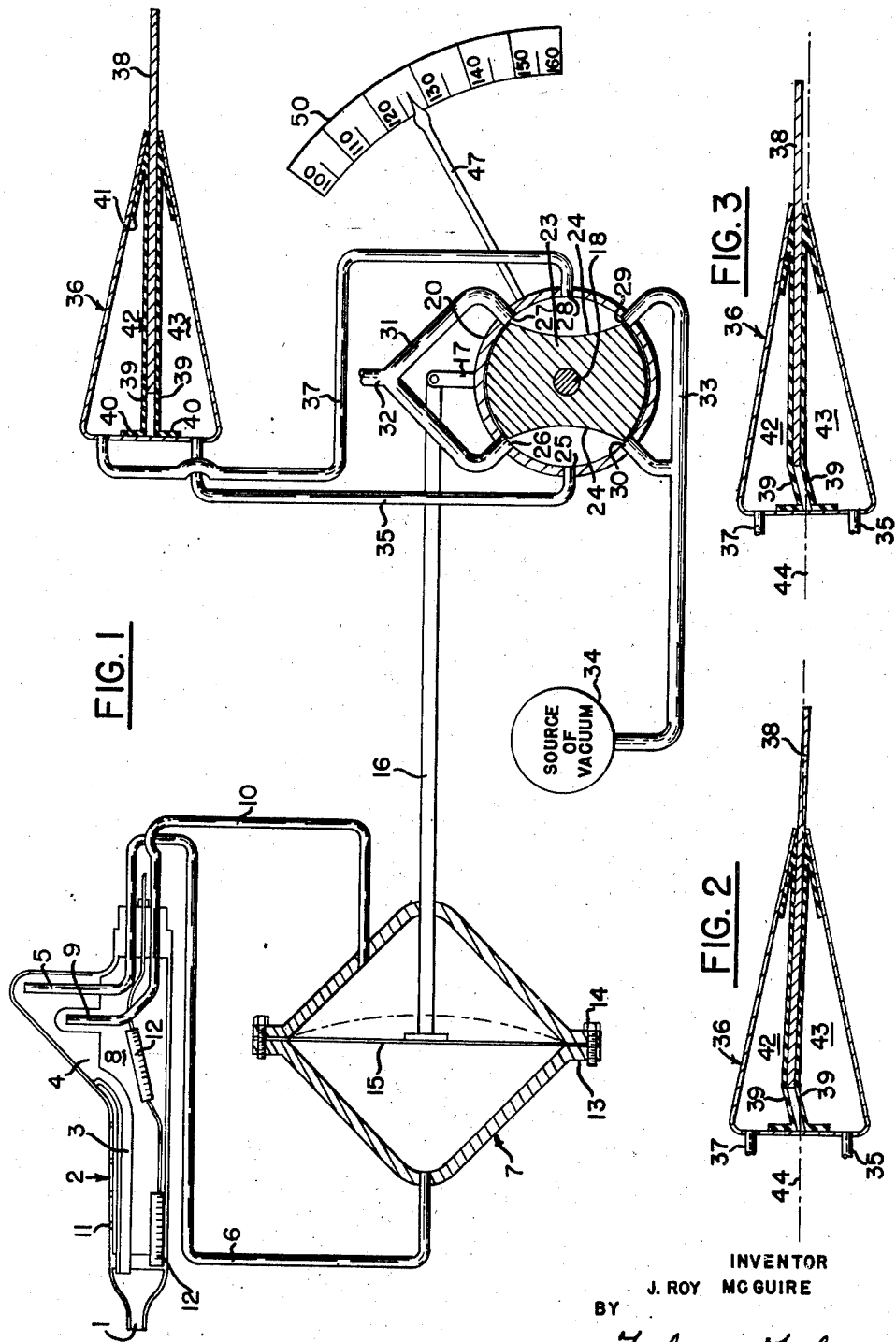

2,542,202

UNITED STATES PATENT OFFICE 2,542,202

AIRCRAFT AIR-SPEED REGULATOR

John Roy McGuire, Dayton, Ohio

Application June 3, 1946, Serial No. 674,115

2 Claims. (Cl. 244—78)

The present invention relates to airplane flying instruments, more particularly to devices for stabilizing and setting the air speed.

It has been difficult heretofore to control the speed of a plane within reasonably close limits. The "cycling effect" which is encountered by ordinary pilots is due to variable air speeds. The pilot, when he finds that the air speed shown on the meter is increasing, immediately tilts the nose of the plane upwardly to give a greater angle of attack but manipulating the proper controls to prevent a climbing movement. The tilted attitude of the plane would normally cause the air speed to reduce. The air speed indicator is usualy sluggish so that the indications are not recorded sufficiently instantaneous to give the pilot the correct speed at any particular moment and the proper speed is not indicated for a short time later and sometimes too late in the case of high speed planes for the pilot to exercise the proper controls. Assuming that the indicator has shown an increase in speed, the pilot tries immediately to offset this change by introducing the necessary drag, the effect of which is to change the flying condition of the plane a considerable time after the need for the changes has arisen. There is, therefore, always an appreciable lag between the change called for in order to restore the constant air speed and the acts of the pilot which effects the changes. The result is that the plane will "cycle" through the air, first moving upwardly and then downwardly as the various correcting controls are applied and it is quite difficult if not impossible to cause the plane to fly on a true straight line course at proper air speed.

The primary object of the invention is to provide an improved method and structure for controlling the air speed of a plane.

Another object is to provide apparatus by which, after the desired air speed is set as when cruising, controls are immediately effective at the slightest change in air speed to bring the plane back to the proper speed and without the help of the pilot.

Still another object is to provide control apparatus in a plane which causes the speed of the plane to remain substantially constant at the desired speed, regardless of air conditions so that the so-called "cycling" operation of the plane about its lateral axis is eliminated.

Another object is to provide improved speed control apparatus which automatically determines the speed of the plane and which apparatus is of a relatively simple and inexpensive character, easy to install and thoroughly dependable in operation.

These objects are carried out in brief by providing apparatus which differentiates between the Pitot and static pressure and this pressure difference is employed to control the movement of trim tabs which, operating through the large controllable air surfaces of the plane causes the latter to assume an attitude such as to effect the desired speed. The invention will be better understood when reference is made to the following description and the accompanying drawings, in which:

Figure 1 represents a lay-out of the various parts of the apparatus, showing the complete system and manner of operation. Some of the parts have been shown in section for clearness.

Figure 2 is a cross-sectional view of an elevator or other air control surface provided with a movable trim tab which is automatically moved to control the desired speed in accordance with the principles of the present invention. This figure shows the position of the elevator before it is moved by the trim tab.

Figure 3 is a view similar to Figure 2 but showing the elevator in an inclined or moved position as the result of the movement of the trim tab.

Figure 4 is an elevational and somewhat diagrammatic view of a plane showing the relative location of the various parts of the apparatus by which a constant air speed is attained.

Figure 5 is a plan view, greatly enlarged, of the air speed indicating dial and setting device.

Figure 6 is a section taken along line 6—6 in Figure 5.

Figure 7 is a view mostly schematic showing a modified way in which parts of the speed responsive device can be controlled by the travel of the plane through the air.

Referring more particularly to Figure 1, reference character 1 designates an air intake positioned at the forward edge of an air foil and forming part of a Pitot tube or casing, indicated generally at 2. This tube or casing preferably extends outwardly and well forward from the edge of the air foil as shown in Fig. 4. A conduit 3 communicates with the opening 1 for carrying the intake air into a humped chamber 4 which contains a Pitot tube 5. Tubing 6 is carried through the interior of the air foil and suitably supported to one side of a casing, generally designated at 7. The casing 2 is provided with a second compartment 8 which is completely closed off from the air intake 1 and the tube 3, this compartment containing an open ended conduit 9 which extends out of the Pitot tube through tubing 10 and is connected to the side of the casing 7 opposite from the tubing 6.

Static openings 11 may be provided in the casing 2, these openings communicating with the chamber 8 and therefore with the conduit 9. If desired, heaters 12 of any suitable and well-known type may be contained within the casing 2 to keep the Pitot casing free from ice.

The casing 7 may conveniently take the form of two conically shaped oppositely directed members connected together at integrally formed flanges 13 by means of bolts 14. There is a diaphragm 15 clamped between the two halves of the casing, this diaphragm being of such thickness as readily to flex when subjected to differences of pressure represented by the velocity of the air entering the opening 1 and the static pressure of the air entering the openings 11. A rigid rod 16 is secured to the center of the diaphragm and extends through a hermetic seal (not shown) formed in the right-hand half of the casing 7. The rod connects with a lever 17 which is affixed to the shouldered end of a shaft 18 (Fig. 6). This shaft is rotatably mounted in a circular nut 19 which is threaded in the end of a housing 20. A flange 21 is preferably provided at the opposite end of the housing, this flange forming part of an integral cover plate 22 which in effect leaves a hermetically sealed compartment within the housing.

There is a valve member 23 contained within the housing compartment, the valve member being secured to the shaft 18. As shown in Fig. 1, the valve member has a segmental circular configuration and provided with a pair of oppositely disposed curved surfaces 24 so as to constitute an ordinary form of circular valve. It is apparent that as the lever 17 is moved to the right or left the valve member 23 is rotated in a corresponding direction within the housing.

There are six ports 25, 26, 27, 28, 29 and 30 arranged circumferentially about the housing 20, two of the ports 25, 28 being positioned in the spaces formed between the curved surfaces 24 and the interior of the housing 20. The remaining ports 26, 27, 29 and 30 are disposed preferably at the corners of the valve member 23, assuming the latter to be in a perfectly vertical position. In general, the ports 26 and 29 are opposite one another and the ports 27 and 30 are likewise opposite. The ports 26 and 27 are connected together through a branched conduit 31 on a main conduit 32. The ports 29 and 30 are connected through a conduit 33 and communicate with a source of vacuum 34 of any suitable and well-known type.

The port 25 is connected through a conduit 35 to the interior of a hollow elevator or other elevating control surface, generally designated 36. The port 28 is connected through a conduit 37, also to the interior of the elevator. The elevator is swingably mounted in the usual manner in an air foil of the plane and is provided with the usual controls to the cockpit. The interior of the elevator is partitioned off (not shown) to leave a closed compartment sufficiently wide to accommodate a trim tab 38. This trim tab may be made of plastic material or metal and is preferably supported between a pair of rubber plates 39 which extend the entire width of the trim tab within the aforementioned compartment. For convenience, the rubber plates may be provided with flanged ends 40 in order to facilitate joining with the interior surface of the elevator wall.

The opposite ends of plates 39 provided preferably with bent-over portions, indicated at 41, which are secured to the tapered walls of the elevator so that notwithstanding the fact that the elevator is necessarily provided with an opening through which the trim tab 38 extends, a pair of hermetically sealed compartments 42, 43 are provided within the limited portion of the elevator and on opposite sides of the rubber plates 39. The conduit 35 is connected to one of these compartments 43 and the conduit 37 is in communication with the other of the compartments 42. It is evident that if a pressure differential exists in the two compartments 42, 43 such, as for example, as providing a pressure in compartment 43 and a vacuum in compartment 42, the rubber plates 39 will flex upwardly, as indicated in Figure 2.

In this connection, it will be noted that the trim tab 38 extends over only a limited portion of the length of the rubber plates 39 and the effect of pressure in the lower compartment 43 is to cause the exposed portion of the trim tab 38 to move downwardly with respect to the center line of the elevator 36. This center line is indicated in Figure 2 by the dot-dash line 44 and it will be noted that the trim tab 38 extends angularly away from that line. It is well known that when the trim tab is caused to move downwardly away from the elevator the reaction of the moving air stream on the tab is such as to cause the elevator 36 to swing upwardly and thus to tilt the main air foil which, in turn, causes the plane to nose upwardly. This upward movement of the elevator is indicated in Figure 3 in which the exposed portion of the trim tab now extends in line with the center line of the elevator even though the interior portion of the trim tab and its rubber plates may still retain an upwardly flexed position due to the pressure differentials existing in the compartments 42, 43.

The cover plate of the housing 23 is provided with a centrally threaded opening 45 (Fig. 6) for receiving a screw 46. The latter is adapted to clamp a pointer 47 rigidly to the housing, this pointer having an opening at its outer end for slidably receiving a headed pin 48. The end of the pin is adapted to be received by any one of a number of circularly positioned openings 49 provided in a recessed plate 50. The plate 50 is provided with a circular flange 51 which may carry a number of screws 52 for securing the plate 50 to the instrument panel board 53 of the plane or any other suitable support. In order that the pin 48 may be pressed into any one of the openings 49, a spring 54 may surround the pin, this spring bearing against a washer 55 secured to the pin 48 and also against the underside of the pointer 47.

The housing 20 is rotatably mounted on a ring bearing 56, the latter being carried within a centrally disposed opening provided in the plate 50. The latter may be flanged, as indicated at 57, so as to provide a relatively large bearing surface for the ring 56.

It is evident that when the pin 48 is pulled outwardly from the opening 49 against the urge of the spring 54, the dial 47 can then be moved to any desired position as will be explained presently and the housing 20 is given a corresponding rotary movement, at which time the pin is permitted to re-enter another one of the openings 49 to hold the housing in the desired position.

The general layout of the various conduits and relative position of the parts of the apparatus are shown in Figure 4. The casing 7 is preferably positioned in the air foil near the Pitot tube to minimize lag effect, and also the housing 20, with the exception of the pointer 47 which is mounted on the panel so as to be readily moved by the pilot as explained hereinbefore. The tubing 35, 37 which extends from the housing 20 to the two compartments in the elevator air foil may be made of rigid metal conduits hidden within the frame work of the fuselage so as not to be exposed to breakage and the only flexibility that is required is at a position where these conduits and also all of the remaining conduits enter the housing 20. Short pieces of rubber tubing indicated at 58 may be employed to provide this flexibility because as will be explained presently the movement of the housing 20 is only of a limited character.

As pointed out hereinbefore, the purpose of the apparatus as a whole is to provide an automatic speed control for the plane and therefore may be incorporated as part of an automatic pilot. Assume that the plane is traveling, for example, at 150 air miles-per-hour and it is desired to reduce the air speed to 140 air miles-per-hour and to maintain the plane at that speed. The pointer 47 is moved to the 140 opening in the dial plate 50 by temporarily withdrawing the pin 48 and then allowing it to enter the opening marked 140. This movement of the pointer will cause the housing 20 to move counterclockwise and carrying with it all of the ports 25 to 30, inclusive, the positions of which are also changed with respect to the rotary valve 23 (see Fig. 1). Under these conditions, the vacuum supply port 30 is cutoff by the valve 23 but air pressure can be readily admitted through the pipe 32 to the port 26. This pressure fluid is caused to pass through the conduit 35 into the lower chamber 43. This counterclockwise movement of the housing exposes the port 29 but closes the port 27 so that a vacuum effect is produced within the conduit 37 and therefore in the upper chamber 42. Thus, the flexible plates 39 are caused to bend upwardly as indicated in Figure 2 due to the pressure differential which, in turn, causes the outer or exposed portion of the trim tab 38 to move downwardly about the tapered end of the elevator 36. This will immediately cause the elevator to swing upwardly to change the angle of attack of the plane to an upward tilted attitude. By proper manipulation of the other controls, as by regulating the power or thrust, the pilot can prevent the plane from climbing and the net effect of the maneuver is to slow down the airplane.

As the air speed of the plane is reduced in this manner, the pressure differential in the Pitot tube 6 and the static tube 10 becomes less so that the flexure of the diaphragm 15, indicated by dot-dash lines, also becomes less and the lever 17 is caused to move slightly in the counterclockwise direction, as seen in Figure 1. This movement, in turn, rotates the valve 23 counterclockwise so as to reduce or cutoff entirely the pressure fluid admitted to the tubing 35 and the vacuum supply admitted to the tubing 37 which, in effect, reduces the pressure differential between the compartments 42, 43. Under these conditions, the valve 23 automatically takes a position due to the action of the diaphragm 15 such as to regulate the position of the trim tab with respect to its air foil surface such as to provide the necessary change in the air speed of the plane as determined by the pre-set position of the pointer 47 and the housing 20.

When it is desired to increase the air speed, the pointer is moved clockwise, causing the housing to swing in the same direction. This will permit vacuum to be supplied to the lower compartment 43 and pressure fluid to be supplied to the upper compartment 42. This, in turn, causes the exposed portion of the trim tab to swing upwardly. The elevator 36 is caused thereby to be de-pressed which reduces the angle of the plane and the air speed is correspondingly increased. As the plane continues to gather speed, the pressure on the left hand side of the diaphragm (as seen in Figure 1) is increased which causes the valve element 23 to rotate clockwise and to come to a position at which equilibrium is established insofar as maintaining the proper position of the elevator to keep the plane in the correct attitude as will maintain the desired increased speed.

While I have explained my invention with respect to applying a trim tab to the elevator or elevators of a plane, it will be understood that the automatic trimming effect obtained in accordance with the invention may be applied to any other surface of the plane which is used to control the elevation of the plane.

Inasmuch as the valve rotor 23 is moved in accordance with changes of air speed as differentially determined within the Pilot casing 2, it is evident that I may use any and all devices responsive to air speed for serving this particular function. Thus, in Figure 7, there is shown a downwardly extending lug or projection 59 of which two or more may be provided and spaced apart at the underside of the wing or other air foil 60. A shaft 61 is journalled in these lugs or projections, this shaft extending lengthwise of the wing and into the fuselage. At the outer end, the shaft 61 carries a flapper vane 62 positioned far enough down from the wing 60 as to respond to the moving air. This vane is spring-biased, as indicated at 63, against any suitable form of abutment 64. At the end of the shaft 61 opposite from the vane and preferably within the fuselage, there is a gear 65 which meshes with a gear 66 suitably journalled. A shaft 67, indicated diagrammatically by dot-dash lines, is taken from the gear 66 to a gear 68 through any suitable form of speed reducing mechanism 69. The gear 68 may mesh with a series of gears of which only one 69' is indicated and the latter is adapted to turn the shaft 18 which carries the rotary valve 23.

In operation, as the air strikes the vane 62, the rotary movement of the vane causes the shaft 61 to turn which, through the gearing 66, the mechanism 69, the gears 68, 69' and shaft 17, causes a corresponding rotation of the valve element 23. The purpose of the speed reducing mechanism is to reduce the tendency of any inaccuracy between the swinging movement of the vane 62 and the rotary movement of the valve element 23 due to backlash. As in the case of the structure described in Figure 1, the apparatus shown in Figure 7 serves to rotate the valve member 23 directly in proportion to the speed of the plane. Thus, the vane 62 and shaft 61, together with the gearing, serve the same purpose as the Pitot casing 2 and the casing 7, including the diaphragm 15. Instead of employing a swingable vane a rotating member responsive to the moving air stream could be used coupled through a rack and a speed translating mechanism to the valve element 23. It is desirable that the air responsive vane 62 or equivalent structure be positioned sufficiently far below the air foil 60 as to be unaffected by eddies and other air turbulence immediately adjacent the air foil. The apparatus shown in Figure 7 for actuating the valve member 23 is of relatively simple and inexpensive character since it does not involve a costly Pitot casing. Any icing effect can be eliminated in the same manner as in the Pitot casing in which heater elements 12 were provided.

It is apparent that the operation of the improved apparatus provides a sensitive but highly stable control of the speed of a plane by automatically changing the attitude of the plane in the proper direction to provide the change in speed. Inasmuch as it is possible to maintain the air speed within fairly close limits due to this sensitivity of operation, any tendency of the plane to "cycle," i. e., to move about its lateral axis when flying blind or under low visibility conditions, is entirely eliminated.

It will be understood that various modifications and arrangements in structure could be made without departing from the spirit of my invention and, accordingly, I desire to comprehend such modifications and substitutions of equivalents as may be considered to come within the scope of the appended claims.

Having thus fully described my invention, what I claim as new and desire to secure by Letters Patent, is:

1. A speed maintaining device for airplanes comprising an actuator for moving an air control member of the plane to change the attitude and speed thereof, said member being hollow, means for setting said actuator in accordance with the desired speed to be attained, said actuator including a flexible diaphragm contained within said control member and extending therebeyond to leave a tab which determines the position of said control member with respect to the plane, and valve mechanism for presenting a pressure differential to opposite sides of the diaphragm to move the diaphragm and tab so as to change the attitude of the plane, said valve mechanism being controlled in part by the operator who sets the desired speed and also in part by the pressure differential developed between a Pitot tube and a static tube positioned near the front end of the plane.

2. A speed maintaining device for airplanes comprising a valve operated actuator, a pressure fluid controlled by said actuator, means responsive to said fluid for controlling the attitude and speed of the plane, and means for setting the valve of said actuator in a position as to cause the plane to travel at a predetermined speed, said first-mentioned means comprising a hollow elevator containing a flexible member which responds to said fluid and carries a tab exterior of said elevator for controlling the elevator in response to changes in the pressure of said fluid.

J. ROY McGUIRE.

REFERENCES CITED

The following references are of record in the file of this patent:

UNITED STATES PATENTS

| Number | Name | Date |
|---|---|---|
| 2,144,614 | Carlson | Jan. 24, 1939 |
| 2,162,940 | De Florez | June 30, 1939 |
| 2,167,077 | Koster | July 25, 1939 |
| 2,188,834 | Fischel et al. | Jan. 30, 1940 |
| 2,238,300 | Zand | Apr. 15, 1941 |
| 2,284,509 | Boes | May 26, 1942 |
| 2,322,782 | Hemstreet | June 29, 1943 |
| 2,352,649 | Meredith | July 4, 1944 |
| 2,368,059 | White | Jan. 23, 1945 |
| 2,383,779 | Dobmeier et al. | Aug. 28, 1945 |
| 2,391,896 | Hanson | Jan. 1, 1946 |
| 2,401,790 | Noyes et al. | June 11, 1946 |
| 2,416,958 | Sears | Mar. 4, 1947 |

FOREIGN PATENTS

| Number | Country | Date |
|---|---|---|
| 574,152 | Great Britain | Dec. 21, 1945 |